United States Patent
Sartori et al.

(10) Patent No.: US 8,131,300 B2
(45) Date of Patent: Mar. 6, 2012

(54) ROUTING PROTOCOL WITHIN HYBRID-CELLULAR NETWORKS

(75) Inventors: Philippe J. Sartori, Algonquin, IL (US); Kevin L. Baum, Rolling Meadows, IL (US); Brian K. Classon, Palatine, IL (US); Vinayak Tripathi, Princeton, NJ (US); Eugene Visotsky, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1544 days.

(21) Appl. No.: 10/833,533

(22) Filed: Apr. 28, 2004

(65) Prior Publication Data

US 2005/0245270 A1    Nov. 3, 2005

(51) Int. Cl.
*H04Q 7/20* (2006.01)
(52) U.S. Cl. .......... 455/445; 455/115.1; 455/115.3; 455/428; 709/238; 709/243; 709/239
(58) Field of Classification Search .......... 455/452, 455/453, 663, 426, 414, 115.1, 115.3, 445, 455/428; 370/252, 329, 338; 709/238–243
See application file for complete search history.

(56) References Cited

U.S. PATENT DOCUMENTS

| | | | | |
|---|---|---|---|---|
| 5,594,946 | A * | 1/1997 | Menich et al. | 455/522 |
| 6,560,460 | B1 * | 5/2003 | Horneman et al. | 455/452.2 |
| 7,151,769 | B2 * | 12/2006 | Stanforth et al. | 370/351 |
| 2002/0013856 | A1 * | 1/2002 | Garcia-Luna-Aceves et al. | 709/238 |
| 2003/0076787 | A1 * | 4/2003 | Katz et al. | 370/252 |
| 2005/0003827 | A1 * | 1/2005 | Whelan | 455/454 |
| 2006/0023689 | A1 | 2/2006 | Allen et al. | |
| 2006/0056296 | A1 * | 3/2006 | Nandagopalan et al. | 370/230 |

FOREIGN PATENT DOCUMENTS

| | | |
|---|---|---|
| WO | 97/25826 | 7/1997 |
| WO | 9725826 | 7/1997 |

OTHER PUBLICATIONS

Heinzelman, W.R. et al: "Energy-efficient communication protocol for wireless microsesor networks", Proceedings of the 33rd Annual Hawaii International Conference on System Sciences 2000 IEEE Compt. Soc, [Online] vol. 2, Jan. 4, 2000, Jan. 7, 2000 Los Alamitos, CA, USA, INSPEC AN 6530466, URL:http://www.ics.uci.edu/{dsm/ics280sensor/readings/networks/Ieach-hicss2000.pdf>.    all pages.
Corresponding Taiwan Application No. 094113767—Translation of Office Action of the IPO issued Jul. 2011—4 pages.
Corresponding Indian Application No. 2863/KOLNP/2006—First Examination Report dated Apr. 12, 2011—3 pages.
Corresponding Chinese Application No. 200580013426.X—Third Office Action dated Mar. 31, 2011.
Corresponding European Application No. 05737552.9—European Search Report dated May 13, 2009.
Corresponding Chinese Application No. 200580013426.X—Second Office Action dated Nov. 6, 2009.

(Continued)

*Primary Examiner* — Charles Shedrick
(74) *Attorney, Agent, or Firm* — Randi L. Karpinia (57) ABSTRACT

In order to establish routing to/from a base station within a hybrid-cellular network, each network element is assigned a "class" based on a received signal strength of the base station. Each network element is allowed to choose a network element of lower class for relaying information to the base station.

16 Claims, 3 Drawing Sheets

OTHER PUBLICATIONS

Corresponding European Application No. 05737552.9—European Search Report dated Oct. 9, 2009.
Corresponding Korean Application No. Oct. 2006-7022501—(Translations) Reexamination Report and Decision to Dismiss Amendment dated Oct. 8, 2008.
Corresponding Chinese Application No. 200580013426.X—First Office Action dated Nov. 14, 2008.
Corresponding Korean Application No. 10-2006-7022501—(Translations) Final Rejection dated May 23, 2008.
Corresponding Korean Application No. 10-2006-7022501—(Translations) Notice of Preliminary Rejection dated Nov. 29, 2007.
EPC Rejection to corresponding EPC Application No. 05 737 522.9 dated Jan. 1, 2011—7 pages.

* cited by examiner

FIG. 3

FIG. 1
Prior-art
100

ROUTING PROTOCOL WITHIN HYBRID-CELLULAR NETWORKS

FIELD OF THE INVENTION

The present invention relates generally to cellular networks, and in particular, to a routing protocol within hybrid-cellular networks.

BACKGROUND OF THE INVENTION

Figure 1:
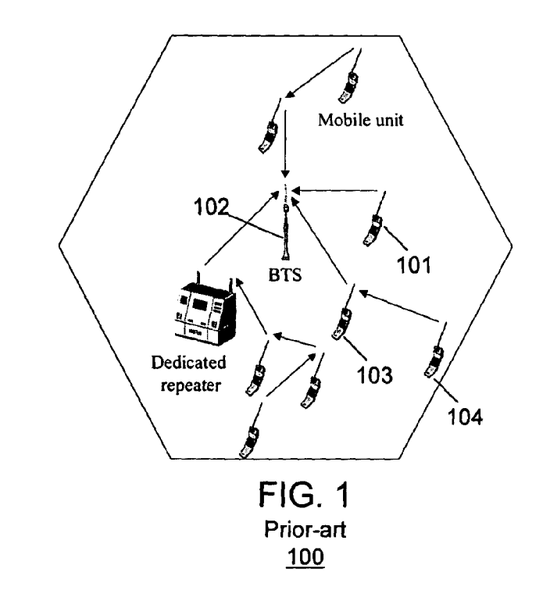
FIG. 1 is a block diagram of a prior-art hybrid-cellular network.

In a traditional cellular network, mobile units establish direct downlink and uplink connections with a backbone network access point such as a cellular base station (BTS). A recently proposed hybrid-cellular network (HCN) seeks to alleviate the limitations of traditional cellular systems by allowing uplink and downlink connections to involve more than one link, with all links either originating, or terminating at the BTS. Such a system is a hybrid between cellular and ad hoc network architectures, where uplink and/or downlink data is relayed to and from the BTS by other mobile units or dedicated repeaters. An example of HCN 100 is depicted in FIG. 1. As is evident, communication to/from base station 102 may exist either as a direct link to the mobile unit (as with mobile unit 101) or may have one or more intermediate relays (as with mobile unit 104 being routed through mobile unit 103). With the introduction of intermediate relays, long-range transmission can be broken into several shorter-range links, allowing for a reduction in the BTS transmission power on the downlink and increasing capacity of the uplink.

A major challenge in constructing a hybrid-cellular network is implementing an efficient routing protocol. The process of routing in a network from a node A1 to a node A2 consists of establishing a sequence of intermediate nodes that are used as relays to transmit information from node A1 to node A2, and from node A2 to node A1. Routing can be direct when no intermediate node is involved from transmitting from node A1 to node A2, and from node A2 to node A1. The goal is to create a robust routing protocol capable of maintaining routing information in a highly mobile network, yet without the overhead of excessive signaling. Most of the research activities on this subject have focused on adapting ad hoc routing protocols, such as Ad hoc On-demand Vector Routing (AODV), Dynamic Source Routing (DSR), and Destination-Sequenced Distance Vector Routing, for use in an HCN. These protocols are efficient for gathering and maintaining routing information in a general ad hoc network, involving topology with multiple source-destination pairs, but are needlessly complicated for an HCN topology, where every route has a common source or destination node. Therefore, a need exists for a routing protocol within a HCN that is less complicated for HCN topologies, yet is efficient for gathering and maintaining routing information.

DETAILED DESCRIPTION OF THE DRAWINGS

To address the above-mentioned need, a routing protocol for a hybrid-cellular network is disclosed herein. In order to establish routing to/from a base station within a hybrid-cellular network, each network element is assigned a "class of operation" based on a received signal strength of the base station. Each network element is allowed to choose a network element of lower class for relaying information to the base station. The above routing protocol is an efficient, yet non-complex means for routing information in a hybrid-cellular network, where every route has a common source or destination node.

The present invention encompasses a method for determining a route within a hybrid-cellular network. The method comprises the steps of determining a signal characteristic of a transmission from a base station, and based on the signal characteristic, determining a particular class of operation. A network element having a lower class of operation is then chosen for routing data and data is routed through the network element having the lower class of operation.

The present invention additionally encompasses a method comprising the steps of receiving a plurality of thresholds $T_1$ through $T_J$ to be used by a network element for class determination, receiving a downlink transmission from a base station, and determining a signal characteristic for the downlink transmission. Based on the signal characteristic and the plurality of thresholds, a particular class of operation is determined for the network element. Class information is then received for other network elements and a network element having class <k is chosen for routing data.

The present invention additionally encompasses an apparatus for determining a route within a hybrid-cellular network. The apparatus comprises means for determining a signal characteristic of a transmission from a base station, means for determining a particular class of operation based on the signal characteristic, means for choosing a network element having lower a lower class of operation for routing data, and means for routing the data through the network element having the lower class of operation.

Figure 2:
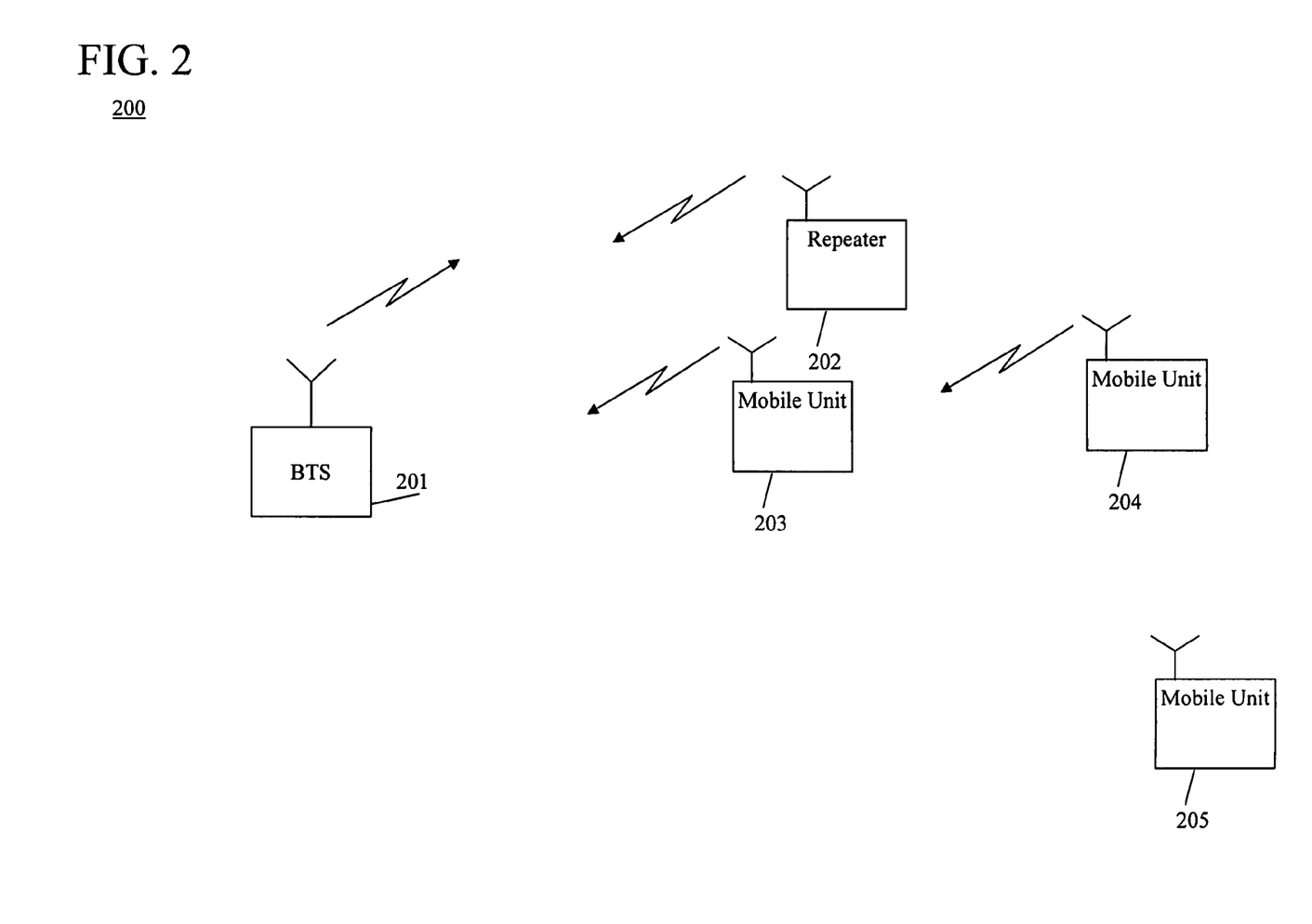
FIG. 2 is a block diagram of a particular cell for a communication system capable of operating as a traditional cellular system or a hybrid cellular system.

Turning now to the drawings, wherein like numerals designate like components, FIG. 2 is a block diagram of a particular cell 200 for a communication system capable of operating as a traditional cellular system or a hybrid cellular system. Cell 200 contains BTS 201 and a number of mobile or remote units 203-205 (only three shown). The set of remote units 203-205 is comprised of the terminals 203-204 maintaining active communication with BTS 201 and the terminals 205 that are in "sleep" mode, i.e., the terminals that are powered on but not maintaining an active connection with the BTS. Note that a terminal in "sleep" mode can still listen to some channels, such as the paging channels or the broadcast channel, but does not transmit any data or control information, so that most of the time the BTS is not even aware of the presence of this terminal in its coverage area. A remote unit could be stationary or mobile. Cell 200 may also include a number of stationary repeaters 202, which are specifically deployed for relaying data between BTS 201 and the active remote units 203-204. BTS 201, remote units 203-205, and stationary repeaters 202 comprise a set of network elements within a cell.

During operation cell 200 may function as either in standard cellular telephone mode or in HCN mode. During standard operation all communications between mobile units 203-205 and base station 201 take place with direct communication between mobile units 203-205 and base station 201. As discussed above, during HCN operation, all links either originate, or terminate at BTS 201; however uplink and/or downlink data may be relayed to and from BTS 201 by other remote units or dedicated repeaters. Cell 200 may convert from one mode of operation to another.

As discussed above, a problem exists in establishing a routing protocol that is efficient in gathering routing information, yet is less complicated than prior-art protocols. In order to address this issue the routing protocol relies on establishing J+1 classes of operation among the network elements. BTS 201 is always a class 0 entity, whereas other network elements belong to class 1 through J. At any given time, a network element may only belong to a single class, and for uplink transmissions (i.e., those transmissions that terminate at BTS 201) may relay data to only those network elements having a lower value in class. In a similar manner, for uplink transmissions network elements may only receive relayed transmissions from network elements having a greater value in class. Thus, for uplink transmissions a network element having class x may only relay information received from network elements having class >x, and may perform relay transmissions only to network elements having class <x.

For downlink transmissions, (i.e., those transmissions that originate at BTS 201) a network element may relay data to only those network elements having a higher value in class. In a similar manner, for downlink transmissions, network elements may only receive relayed transmissions from network elements having a lower value in class. Thus, for downlink transmissions a network element having class x may only relay information received from network elements having class <x, and may perform relay transmissions only to network elements having class >x. For both uplink and downlink transmissions, class membership is determined based on the strength of the received signal from the BTS.

As discussed, it is assumed that the BTS 201 is a common destination on the uplink, and common source on the downlink, for all routes in a cell. Each route is established by specifying a sequence of links between the network elements. The routes are established sequentially class by class. Consider the routing procedure for class j network elements. At this stage of the protocol, the routes between BTS 201 and all network elements belonging to classes 1 through j−1 have been established. A class j network element evaluates link quality to at least some, and preferably all, class 0 through j−1 network elements and establishes a link with the best one. In the first embodiment of the present invention the received signal strength from a network element is used as an indicator of the link quality. In alternate embodiments, however, other link quality indicators, such as the C/I ratio, C/N, C/(I+N), BER, FER, link loading, or the average path loss are used. The average path loss is most useful as a quality metric when the network elements transmit at varying power levels. For a given class j network element, only a subset comprised of the neighboring class 0 through j−1 network elements needs to be considered.

In an alternate embodiment of this invention, a class j network element evaluates link quality to at least some, and preferably all, class 0 through j−1 network elements and determines a group of potential network elements for relaying. It establishes a connection with one of the network elements from this group. If at a later point in time, the connection quality becomes unsatisfactory, the class j network element may attempt to establish a connection with another network element from this group.

In a further alternate embodiment, a class j network element may establish a connection with one of the class 0 through j−1 network elements based on a cumulative path quality metric announced by that network element. In the further alternate embodiment, the cumulative path metric is a sum of link characteristics along the path of that network element to the BTS. The link characteristics may comprise such things as quality metrics for the links, link C/I ratio, C/N, C/(I+N), BER, FER, the average path loss on the links, the amount of traffic flowing through the links (link loading), . . . , etc. The cumulative path metrics may include a penalty term for the number of hops along the path to the BTS.

The protocol effectively constructs a spanning tree rooted at the BTS 201 for all network elements in a given cell. With this construction, every class 1 network element necessarily communicates directly with the BTS 201, and, more generally, every class j network element communicates with a single network element of class 0 through j−1. Note that links between network elements of the same classes are forbidden in order to avoid cycles in the routing graph. For any link, the lower-class network element is termed the "parent" and the higher-class network element is termed the "child". A given network element has a single "parent" and can have multiple "children".

As one of ordinary skill in the art will recognize, any HCN routing protocol will need to address two related routing tasks: (i) conversion of the network from cellular to HCN topology, and (ii) incremental update of the routes once the HCN topology is established. The conversion procedure configures the initial HCN, whereas incremental updates of the routes adapt to changes in the network.

Conversion from Cellular to HCN Topology

Figure 3:
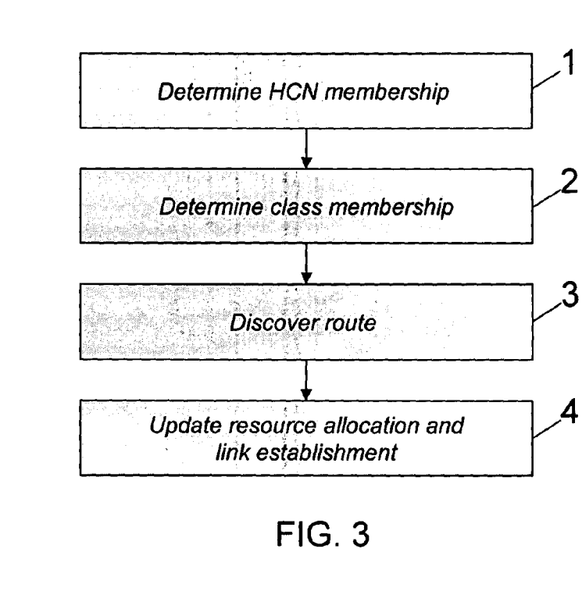
FIG. 3 is a flow chart showing the steps necessary to convert from a cellular network to a hybrid-cellular network.

Consider now details of the conversion procedure from cellular to HCN topology based on the above routing protocol. This conversion process could occur on a per-cell basis, and does not need to be performed simultaneously for the whole network. The conversion involves the dedicated repeaters and the network elements that are actively maintaining communication with BTS 201 since network elements that are in "sleep" mode could be incorporated into the HCN by the subsequent incremental updates in the topology. Alternatively, the units in "sleep" mode could be paged and be commanded to participate in the conversion process. This embodiment is particularly useful if dedicated repeaters are allowed to transition to "sleep" mode. The conversion, a flowchart of which is shown in FIG. 3, is as follows.

Step 1. Determine HCN membership. On the cellular downlink, BTS 201 indicates to all active network elements in the cell that conversion to HCN is to begin by broadcasting a probe signal on the broadcast control channel or a new logical channel. BTS 201 then commands every active network element to report back an HCN participation flag. This flag indicates whether a network element is suitable for participation in the HCN. For instance, depending on the state of its battery, its speed or its hardware capabilities, a network element may not be qualified to participate. The non-participating network elements continue communication with BTS 201 in cellular mode. In order to conserve bandwidth, the HCN participation flag can be sent only by network elements willing to participate in the HCN. Not responding would then mean that the network element will not participate in the HCN.

Step 2. Determine class membership. BTS 201 commands all network elements participating in the HCN to determine their particular class of operation. This is accomplished by BTS 201 broadcasting a set of thresholds $T_1$ through $T_j$ to be used by the network elements for class determination. This broadcasting can occur at the time when the conversion is initiated, or periodically broadcasted on a control channel. In an alternate embodiment the thresholds are hard-coded in the network element. The network elements measure a signal characteristic for a downlink transmission from BTS 201. In the first embodiment of the present invention the downlink received signal strength (RSS) from BTS 201 is utilized, however in alternate embodiments other signal characteristics such as a Carrier to Interference (C/I) ratio, bit error rate (BER), frame error rate (FER), ..., etc. may be utilized. The RSS is averaged over a sufficient period of time to determine their class as follows: if RSS$\geq T_1$, then the network element is a member of class 1. If RSS$<T_j$, then the network element is a member of class . If, however, if $T_{k-1}>$RSS$\geq T_k$, where k is an integer such that 1<k<J, then the network element is a member of class-k. Alternatively, BTS 201 could determine the class of the participating network elements based on the RSS measurements (or other metrics) obtained on the cellular uplink, and then transmit the class designations to the corresponding network elements. Additionally, in an alternate embodiment, network elements measure a signal characteristic for a downlink transmission from BTS 201 and report these measurements back to the BTS 201. The BTS then determines the class for each network element and informs each network element of its class.

Step 3. Discover route. Upon completion of the class determination step, BTS 201 assigns every participating network element a preferably uniquely identifiable pilot waveform and commands all participating elements in cell 200 to participate in a route discovery session (RDS). In an alternate embodiment, the pilot waveforms could be pre-assigned by the BTS 201 to each network element prior to formation of HCN. During the RDS, each network element will determine a period for transmission based on its class of operation and then broadcast a signal (e.g., its pilot) during a pre-determined time period. The signal is utilized by other network elements for choosing a relay. Specifically, the duration of the RDS is divided into J time periods, one for each class 1 through J. (Note it is assumed that within a cell all participating network elements are at least coarsely frame-aligned). In each time period, every network element of the corresponding class transmits its unique pilot and a control message (the control message may also be modulated by the pilot waveform). BTS 201 transmits its unique pilot whether or not in RDS. In addition to transmitting during its time period, each network element will receive the pilot signals and control messages transmitted by other network elements in other time periods and then determine the class and identity of these network elements. A network element of lower class is then chosen that will serve as a relay. In the first embodiment of the present invention the network element chosen will be the one of lower class having a best signal strength as measured at the "child" network element. In an alternate embodiment, the network element chosen will be the one of lower class having a lowest cumulative path metric. This information will then be made available to BTS 201.

Step 4. Update resource allocation and link establishment. Upon completion of route discovery, BTS 201 relies on the topology information gathered during the RDS to allocate resources, such as transmit powers and segments in the space-time-frequency grid, for communication links between "children" and their corresponding "parents". With resources assigned, links between "parents" and their corresponding "children" are established. In general, the link establishment can be centralized (BTS-directed) or decentralized. In the centralized case, BTS 201 on the cellular downlink directs each "parent"-"child" pair to begin transmission and reception on the link's assigned resources. In the decentralized case, BTS 201 on the cellular downlink informs each "parent" of its assigned resources, and each "parent"-"child" pair establishes communication autonomously and asynchronously of other pairs (e.g., using the random access channel procedure or pre-allocated slots with a contention mechanism).

Figure 4:
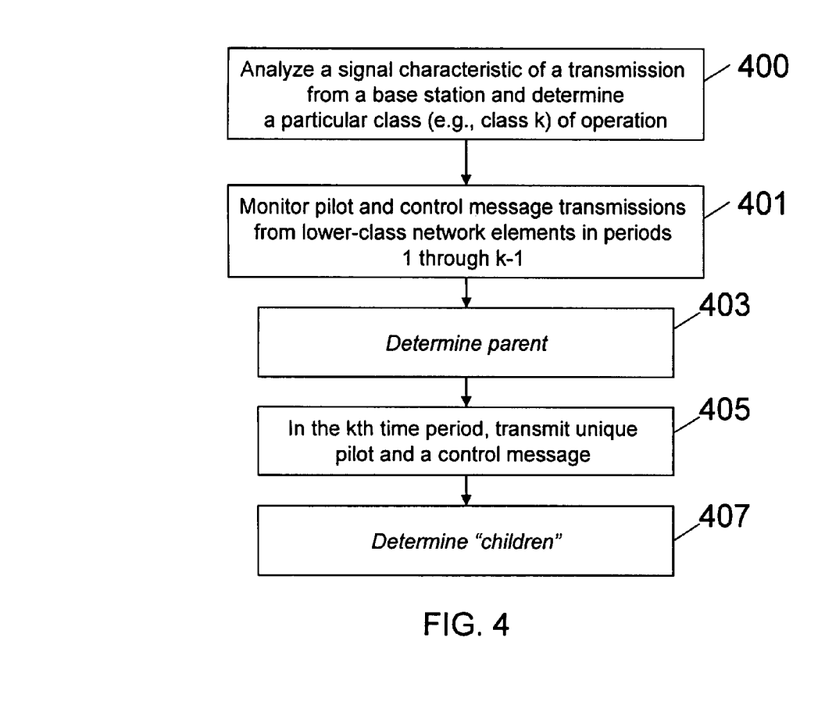
FIG. 4 is a flow chart showing operation of a class J network element during route discovery.

FIG. 4 is a flow chart showing operation of a class-k network element 500 (shown in FIG. 5) during route discovery. For route discovery, it is envisioned that the pilots are direct sequence spread spectrum waveforms (either in time domain or in frequency domain), and received by transceiver 501. (Other signaling schemes that are robust against co-channel interference and amenable to fast acquisition are suitable.) The pilot and control message transmissions could be of relatively low power, unless they are destined for BTS 201, since only the neighboring network elements need to exchange routing information. In practice, logic circuitry 502 (e.g., a computer program executing computer-readable code, or a microprocessor controller executing embedded instructions) is provided to analyze received pilots and determine those network elements acceptable for routing data. In particular, logic circuitry 502 serves as means for determining a signal characteristic of a transmission from a base station, means for determining a particular class of operation for network element 500, means for choosing a network element having a lower class of operation for routing data, and means for routing the data through the network element having the lower class of operation.

Figure 5:
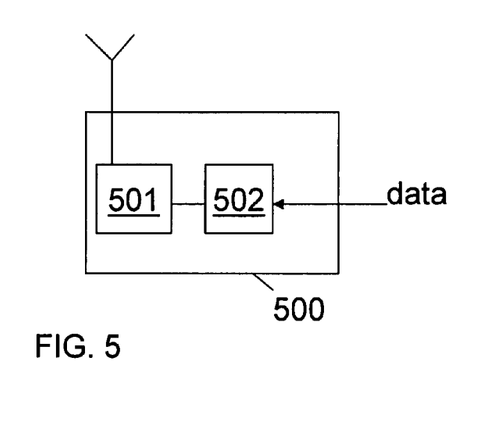
FIG. 5 is a block diagram of a network element.

The logic flow begins at step 400 where logic circuitry 502 analyzes a signal characteristic of a transmission from a base station and determines a particular class (e.g., class k) of operation. At step 401 logic circuitry 502, monitors pilot and control message transmissions from lower-class network elements (including class 0 BTS 201) in periods 1 through k−1. The logic circuitry 502 then determines a "parent" (step 403) whose class is <k. As discussed above, the parent is chosen to be the class 0 through k−1 network element with the best-received signal at the class-k network element. In an alternate embodiment, the logic circuitry 502 evaluates a cumulative path metric of routes to the BTS through one of the lower-class network elements, and picks a lower class network element with the lowest cumulative path metric as its "parent". In the kth time period, transceiver 501 transmits its unique pilot and the control message (step 405) Note that for a class J network element, transmission of the pilot is not necessary, but transmission of a control message indicating its choice of the "parent" is still required. In the control message, the network element announces its own class (note that this announcement can be implicit since only class-k network elements will be transmitting during this time period), announces its "parent", and, according to an alternate embodiment, includes cumulative metric of its path to the BTS. In the k+1 through J time periods, logic circuitry 502 monitors the control message announcements from higher-class network elements and determines its "children". At the completion of the RDS, assuming that all control messages reach their intended destinations, every network element is aware of its "parent" and its "children". BTS 201 determines the topology of the HCN by polling network elements on the cellular downlink. Note that this step is not necessary if BTS 201 has successfully received all messages exchanged during the RDS. When the topology is known by the system, standard HCN routing for uplink transmissions (i.e., data originating at a network element, destined for BTS 201) then takes place by logic circuitry 502 routing the data through the network element having the lower class of operation (as chosen above). In particular, a network element chosen for routing will have its logic circuitry 502 receive uplink data from network elements of higher class of operation (i.e. class >k), and then route the received data to network elements having a lower class of operation.

In a similar manner, routing for downlink transmissions (i.e., data originating at a BTS 201 having a final destination at a network element) takes place by logic circuitry 502 routing the data received from the network element having the lower class of operation. In particular, a network element chosen for routing will have its logic circuitry 502 receive downlink data from network elements of lower class of operation, and then route the received data to network elements having a higher class of operation.

Note that the RDS is a serial process: the pilot waveforms and control messages from network elements of lower classes must be received before the messages from network elements of higher classes. This condition allows the routing tree to be built sequentially from the BTS 201 first, down to the network elements of class J.

As described above with reference to FIG. 3, each network element is assigned a unique pilot waveform. The pilot assignments are not based on the class memberships of the network elements. Hence, during each RDS period a network element needs to monitor the entire set of pilot waveforms in order to learn of its parent or children nodes. To reduce the set of possible pilot waveforms to be searched during each RDS period, the set of pilot waveforms can be partitioned into J subsets, one for each class. With such an assignment, only the j-th subset needs to be searched during the j-th RDS period. The allocation of the subsets can be pre-determined or dynamically assigned by BTS 201 and announced to the participating network elements. To facilitate class-based pilot assignment, BTS 201 might need to receive class reports from the participating network elements. This could be efficiently performed by including the class reports with the HCN participation flags. Note that, although the class-based pilot assignment leads to reduced search complexity, it also results in increased signaling overhead since pilot waveforms need to be reassigned upon class changes of the network elements.

The network elements that were unable to establish an HCN route due to link establishment failure continue to communicate directly with BTS 201. They may attempt to participate in the HCN during subsequent RDS. The network elements that are participating in the HCN tear down their cellular data channels and begin transmitting and receiving data using their HCN routes. Alternatively, the HCN can be used on the uplink or downlink only, while the other link remains in cellular mode. For further control messaging from BTS 201, the downlink control channel structure remains in place for all active network elements (participating in the HCN and non-participating).

Note also that a network element may decide to use the HCN mode for transmitting while not relaying any transmission. This could happen when the battery life of the terminal is low, or because the subscriber owning this network element configured it not to relay any calls. In this case, the network element will force its class to be "class J" in step two of FIG. 3. The other steps of the algorithm described in FIG. 3 remain the same. Alternatively, such a network element could receive all the messages from the other network elements but does not broadcast any pilot waveform or control message. When such a network element needs to transmit, it needs to send the routing path to the BTS so that the BTS knows how to reach it.

Route Maintenance

A route maintenance procedure (RMP) is necessary for coping with changes in HCN membership and topology. The route maintenance procedure BTS-initiated and is performed periodically in each cell, typically every few superframes. The time interval between updates should be sufficiently short to track changes in membership and topology of the network. In an alternate embodiment, RMP could be triggered upon a change of HCN membership.

Figure 6:
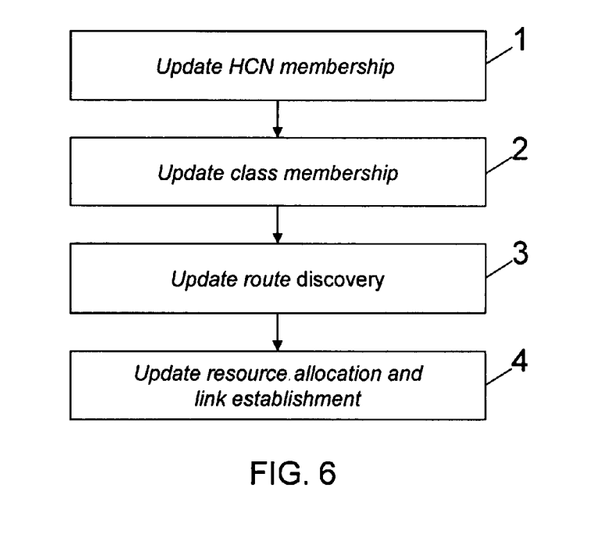
FIG. 6 is a flow chart showing route maintenance.

A change in the HCN membership, for instance, can be due to arrival of a new network element into the cell, due to transition of a network element from "sleep" to active mode, or due to departure of a network element from the cell. Furthermore, the HCN membership will change if BTS 201 attempts to involve the network elements that are in "sleep" mode or dedicated repeaters into the HCN. A change in the HCN topology, for instance, can be due to a change in class memberships of the participating network elements. It is envisioned that a procedure similar to the above four-step HCN conversion procedure is performed periodically for route maintenance. The steps are as follows, and shown in FIG. 6:

Step 1. Update HCN membership. Using the cellular downlink control channels, BTS 201 indicates to all active network elements in the cell that the route maintenance procedure is to begin. BTS 201 then commands every active but not previously participating network element to report back a participation flag. Note that all active non-participating network elements necessarily maintain two-way communication with BTS 201 in cellular mode. All previously participating network elements do not retransmit their participation flag, unless class-based pilot assignment is performed. In this case, each network element with a change in class also transmits an HCN participation flag. BTS 201 can involve a network element in "sleep mode" or a repeater network element into the HCN by paging and commanding the network element to report back an HCN participation flag.

Step 2. Update class membership. BTS 201 commands all network elements participating in the HCN to determine their class. The network elements determine their class as described in Step 2 of the above HCN initialization procedure.

Step 3. Update route discovery. Upon completion of the class determination step, BTS 201 assigns every newly participating network element a uniquely identifiable pilot waveform and commands all elements in the HCN to participate in RDS, as specified in Step 3 of the above HCN initialization procedure. In an alternate embodiment, pilot waveforms are assigned prior to performing RMP. All previously participating network elements that have since become inactive or ineligible to participate in the HCN remain silent during the RDS. Note that by maintaining silence during the RDS, these network elements are effectively excluded from participation in the HCN. To continue communication with BTS 201, they switch to cellular communication mode preferably by means of a BTS 201 uplink random access channel.

Step 4. Update resource allocation and link establishment. This step is identical to Step 4 of the HCN initialization procedure.

Route Failure Recovery

A periodically performed route maintenance procedure provides an efficient mechanism for recovery from route failures. That is, an HCN participating network element whose route is disrupted simply monitors BTS 201 downlink control channel for an announcement of the next route maintenance procedure. By participating in the next route maintenance procedure the network element establishes a new HCN route. If a network element is repeatedly unsuccessful in establishing an HCN route through route maintenance procedures, it enters a cellular operating mode by means of BTS 201 uplink random access channel. Alternatively, a route failure could be an event that triggers an RDS.

HCN Handoff Operation

Inter-cell hand-off for participating network elements is essentially the same as inter-cell hand-off in cellular mode. Specifically, all participating network elements maintain a list of candidate BTSs for inter-cell handoff. To establish a communication link with a new BTS, a participating network element first accesses the new BTS using that BTS's uplink random access channel. At this stage, a (low) data rate channel is established in cellular mode with the new BTS. Upon establishing the cellular link in the new serving cell, the network element tears down its HCN connection in the old cell. Once the cellular link in the new cell is established, if applicable, the network element participates in the route maintenance procedure for the new serving cell. Note that during the handoff process, the network element might experience a lower data rate until it participates in the route maintenance procedure and joins the HCN network in the new cell. Alternatively, a network element arriving could trigger a full RDS. Or, the arriving network element could be prevented to transmit until the next RDS.

Powering Off Procedures

Consider a "parent" network element, which is being powered off by its owner. In this case, a new route to the BTS needs to be discovered by all "children" nodes that are communicating with the BTS through this "parent" node. In the first embodiment of this invention, these "children" nodes, upon terminating their connections with the powered off "parent" node, simply monitor the downlink control channel and participate in the following RMP session. In a second embodiment, the "parent" network element sends to the BTS a "power off" flag. The BTS then immediately initiates RMP. In another embodiment, the "children" re-establish direct communication with the BTS until the next regularly scheduled RMP period. In yet another embodiment, the powering off a network element is delayed until the next periodic route discovery session.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for determining a route within a cell operating in a hybrid-cellular network mode, the method comprising:
    determining, by a network element comprising a first transceiver, a signal characteristic of a transmission received by the first transceiver from a base station, wherein the signal characteristic comprises one or more of a received signal strength, a carrier to interference ratio, a carrier to noise ratio, a carrier to noise plus interference ratio, a bit error rate, a frame error rate, and a link loading;
    based on the signal characteristic, determining, by the network element, a particular class of operation from among a plurality of classes of operation for the network element; and
    choosing, by the network element and based on the network element's determined class of operation, another network element comprising a second transceiver and having a lower class of operation for a routing of data between the network element and the another network element, wherein the another network element is chosen from a group of network elements having a lower class of operation.

2. The method of claim 1 wherein determining the particular class of operation comprises comparing the signal characteristic to one or more thresholds of at least two thresholds associated with the signal characteristic, wherein each threshold of the at least two thresholds serves to distinguish one class of operation of the plurality of classes of operation from another class of operation of the plurality of classes of operation, and determining the particular class of operation based on the comparison.

3. The method of claim 1 wherein determining the particular class of operation comprises:
    receiving a set of thresholds broadcasted from the base station;
    comparing the signal characteristic to the received set of thresholds; and
    determining by the network element, the particular class of operation based on the comparison.

4. The method of claim 1 further comprising:
    determining a time period for transmission for network elements having the particular class of operation; and
    during the time period, transmitting a signal utilized by other network elements for choosing a relay.

5. The method of claim 1 wherein choosing the network element having lower the lower class of operation for routing data, comprises choosing the network element based on a cumulative path quality metric of the network element.

6. A method for determining a route within a cell operating in a hybrid-cellular network mode, the method comprising:
    determining, by a network element comprising a first transceiver, a signal characteristic of a transmission received by the first transceiver from a base station, wherein the signal characteristic comprises one or more of a received signal strength, a carrier to interference ratio, a carrier to noise ratio, a carrier to noise plus interference ratio, a bit error rate, a frame error rate, and a link loading;
    based on the signal characteristic, determining, by the network element, a particular class of operation from among a plurality of classes of operation for the network element; and
    choosing, by the network element and based on the network element's determined class of operation, another network element comprising a second transceiver and having a lower class of operation for a routing of data between the network element and the another network element, wherein choosing comprises receiving signals transmitted by other network elements and determining a network element of lower class having a best signal strength.

7. A method for determining a route within a cell operating in a hybrid-cellular network mode, the method comprising:
    determining, by a network element comprising a first transceiver, a signal characteristic of a transmission received by the first transceiver from a base station, wherein the signal characteristic comprises one or more of a received signal strength, a carrier to interference ratio, a carrier to noise ratio, a carrier to noise plus interference ratio, a bit error rate, a frame error rate, and a link loading;
    based on the signal characteristic, determining, by the network element, a particular class of operation from among a plurality of classes of operation for the network element; and
    choosing, by the network element and based on the network element's determined class of operation, another network element comprising a second transceiver and having a lower class of operation for a routing of data between the network element and the another network element, wherein choosing comprises receiving pilot signals transmitted by other network elements, receiving a class for the other network elements, and determining a network element of lower class having a best pilot signal strength.

8. A method for determining a route within a cell operating in a hybrid-cellular network mode, the method comprising:
determining, by a network element comprising a first transceiver, a signal characteristic of a transmission received by the first transceiver from a base station, wherein the signal characteristic comprises one or more of a received signal strength, a carrier to interference ratio, a carrier to noise ratio, a carrier to noise plus interference ratio, a bit error rate, a frame error rate, and a link loading;
based on the signal characteristic, determining, by the network element, a particular class of operation from among a plurality of classes of operation for the network element;
choosing, by the network element and based on the network element's determined class of operation, another network element comprising a second transceiver and having a lower class of operation for a routing of data between the network element and the another network element; and
performing, by the network element, one or more of:
receiving uplink data from a network element having a higher class of operation and routing the received data to the network element having the lower class of operation; and
receiving the downlink data from a network element having the lower class of operation and routing the downlink data to the network element having a higher class of operation.

9. A method comprising:
receiving, by a network element, a plurality of thresholds $T_1$ through $T_J$ associated with a same signal characteristic to be used by the network element for class determination;
receiving, by the network element, a downlink transmission from a base station;
determining, by the network element, a signal characteristic for the downlink transmission;
based on the signal characteristic and the plurality of thresholds, determining, by the network element, a particular class of operation (k) for the network element;
receiving, by the network element, class of operation information for other network elements, wherein each network element of the other network elements comprises a transceiver; and
choosing, by the network element and based on the network element's determined class of operation, another network element, of the other network elements, having class <k for a routing of data between the network element and the another network elements, wherein choosing comprises one or more of:
receiving signals transmitted by the other network elements of lower class and determining a single network element having class <k and having a best signal strength; and
receiving pilot signals transmitted by the other network elements and determining a single network element of having class <k and having a best pilot signal strength.

10. The method of claim 9 wherein determining the signal characteristic for the downlink transmission comprises determining a signal characteristic from a group of characteristics consisting of a received signal strength, a carrier to interference ratio, a bit error rate, and a frame error rate.

11. The method of claim 9 wherein determining the particular class of operation comprises comparing the signal characteristic to the plurality of thresholds, wherein each threshold of the plurality of thresholds serves to distinguish one class of operation of a plurality of classes of operation from another class of operation of the plurality of classes of operation, and determining the particular class of operation based on the comparison.

12. The method of claim 9 further comprising:
receiving uplink data from a network element having a class >k; and
routing the uplink data to the network element having class <k.

13. The method of claim 9 further comprising:
receiving downlink data from the network element having class <k; and
routing the downlink data to a network element having class >k.

14. The method of claim 9 further comprising:
determining a time period for transmission for network elements having class-k; and
during the time period, transmitting a signal utilized by other network elements for choosing a relay.

15. An apparatus for determining a route within a hybrid-cellular network, the apparatus comprising:
means for determining a signal characteristic of a transmission received by a first transceiver from a base station, wherein the signal characteristic comprises one or more of a received signal strength, a carrier to interference ratio, a carrier to noise ratio, a carrier to noise plus interference ratio, a bit error rate, a frame error rate, and a link loading;
means for determining, a particular class of operation from among a plurality of classes of operation for a network element comprising the first transceiver based on the signal characteristic;
means for choosing, by the apparatus and based on the network element's determined class of operation, another network element comprising a second transceiver and having a lower class of operation for a routing of data between the network element and the another network element, wherein the another network element is chosen from a group of network elements having a lower class of operation; and
means for routing the data through the network element having the lower class of operation.

16. A method for determining a route within a cell operating in a hybrid-cellular network mode, the method comprising:
determining, by a network element comprising a first transceiver, a signal characteristic of a transmission received by the first transceiver from a base station;
based on the signal characteristic, determining, by the network element, a particular class of operation from among plurality of classes of operation for the network element; and
choosing, by the network element and based on the network element's determined class of operation, another network element comprising a second transceiver and having a lower class of operation for a routing of data between the network element and the another network element, wherein the chosen network element is used to relay data between the base station and the first transceiver; and
performing, by the network element, one or more of:
receiving uplink data from a network element having a higher class of operation and routing the received data to the network element having the lower class of operation; and
receiving the downlink data from a network element having the lower class of operation and routing the downlink data to the network element having a higher class of operation.

* * * * *

UNITED STATES PATENT AND TRADEMARK OFFICE
CERTIFICATE OF CORRECTION

PATENT NO. : 8,131,300 B2  
APPLICATION NO. : 10/833533  
DATED : March 6, 2012  
INVENTOR(S) : Sartori et al.

Page 1 of 1

It is certified that error appears in the above-identified patent and that said Letters Patent is hereby corrected as shown below:

On the title page, item (56), under "OTHER PUBLICATIONS", in Column 2, Line 2, delete "microsesor" and insert -- microsensor --, therefor.

Signed and Sealed this
Eighteenth Day of December, 2012

David J. Kappos
*Director of the United States Patent and Trademark Office*